United States Patent [19]

Kasano et al.

[11] Patent Number: 4,975,973
[45] Date of Patent: Dec. 4, 1990

[54] IMAGE PROCESSING DEVICE SUITABLE FOR OBTAINING THE VOLUME AND CENTER OF GRAVITY OF A THREE-DIMENSIONAL BINARY IMAGE

[75] Inventors: Akira Kasano; Yoichi Inoue, both of Tokyo, Japan

[73] Assignee: Kabushiki Kaisha Toshiba, Kawasaki, Japan

[21] Appl. No.: 198,442

[22] Filed: May 25, 1988

[30] Foreign Application Priority Data

May 30, 1987 [JP] Japan .................................. 62-136316

[51] Int. Cl.⁵ ............................................... G06K 9/46
[52] U.S. Cl. ....................................... 382/18; 382/23; 382/28; 358/107
[58] Field of Search .............................. 382/18, 23, 28; 358/107, 88; 356/1, 379, 380, 372; 364/564, 560, 570, 521

[56] References Cited

U.S. PATENT DOCUMENTS

| | | | |
|---|---|---|---|
| 4,573,191 | 2/1986 | Kidode et al. | 382/1 |
| 4,661,985 | 12/1984 | Akutsu | 382/28 |
| 4,687,107 | 8/1987 | Brown et al. | 364/564 |
| 4,748,676 | 5/1988 | Miyagawa et al. | 382/28 |
| 4,773,029 | 9/1988 | Claesson et al. | 364/564 |
| 4,827,432 | 5/1989 | Kasano | 382/41 |
| 4,837,616 | 6/1989 | Kasano et al. | 358/107 |
| 4,858,157 | 8/1989 | Murai et al. | 364/525 |

OTHER PUBLICATIONS

Translation of German Office Action of Feb. 2, 1989.

*Primary Examiner*—David K. Moore
*Assistant Examiner*—Michael Razavi
*Attorney, Agent, or Firm*—Finnegan, Henderson, Farabow, Garrett and Dunner

[57] ABSTRACT

A first memory stores a divided three-dimensional binary image as image data j of p bits. A second memory, equal to the first memory in size, stores data k of q bits, representing the section number of a corresponding memory section of the first memory. A histogram computing circuit concatenates data j and data k and obtains a histogram for the concatenated data. A computing unit computes a marginal distribution of the three-dimensional image on the basis of the histogram. A data conversion unit converts the p bit data to a first data image. An adder unit obtains from the first image a second image representing the marginal distribution P(x,y). The computing unit computes a marginal distribution P(x) and a marginal distribution P(y) from the second image, and also computes the volume and center of gravity of the three-dimensional binary image.

20 Claims, 4 Drawing Sheets

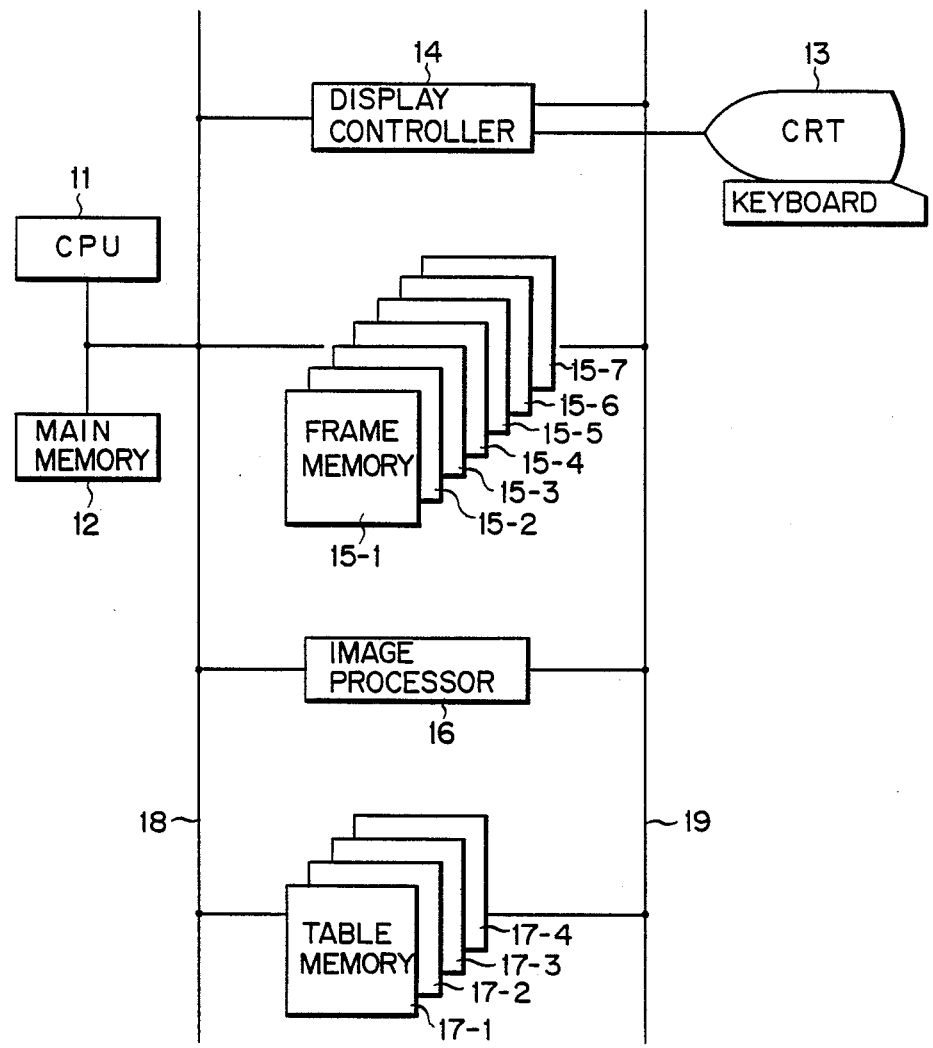
F I G. 1

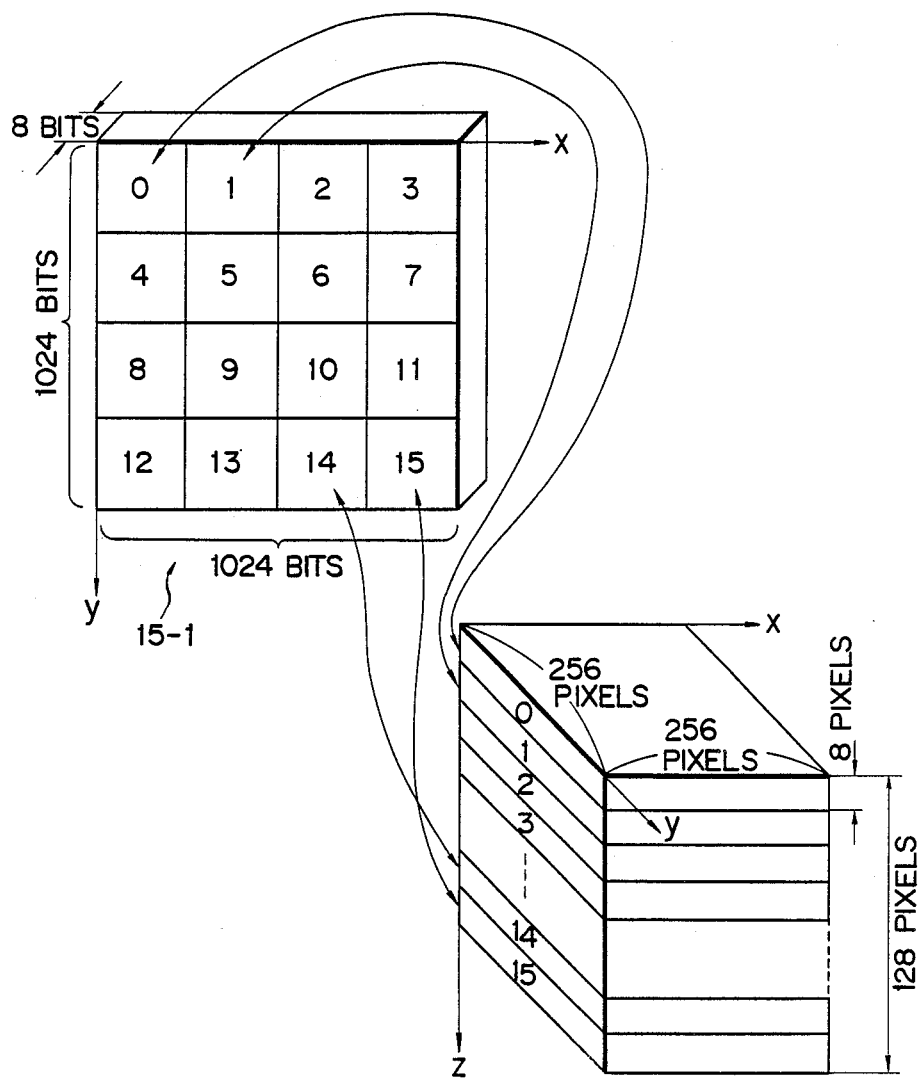
F I G. 2

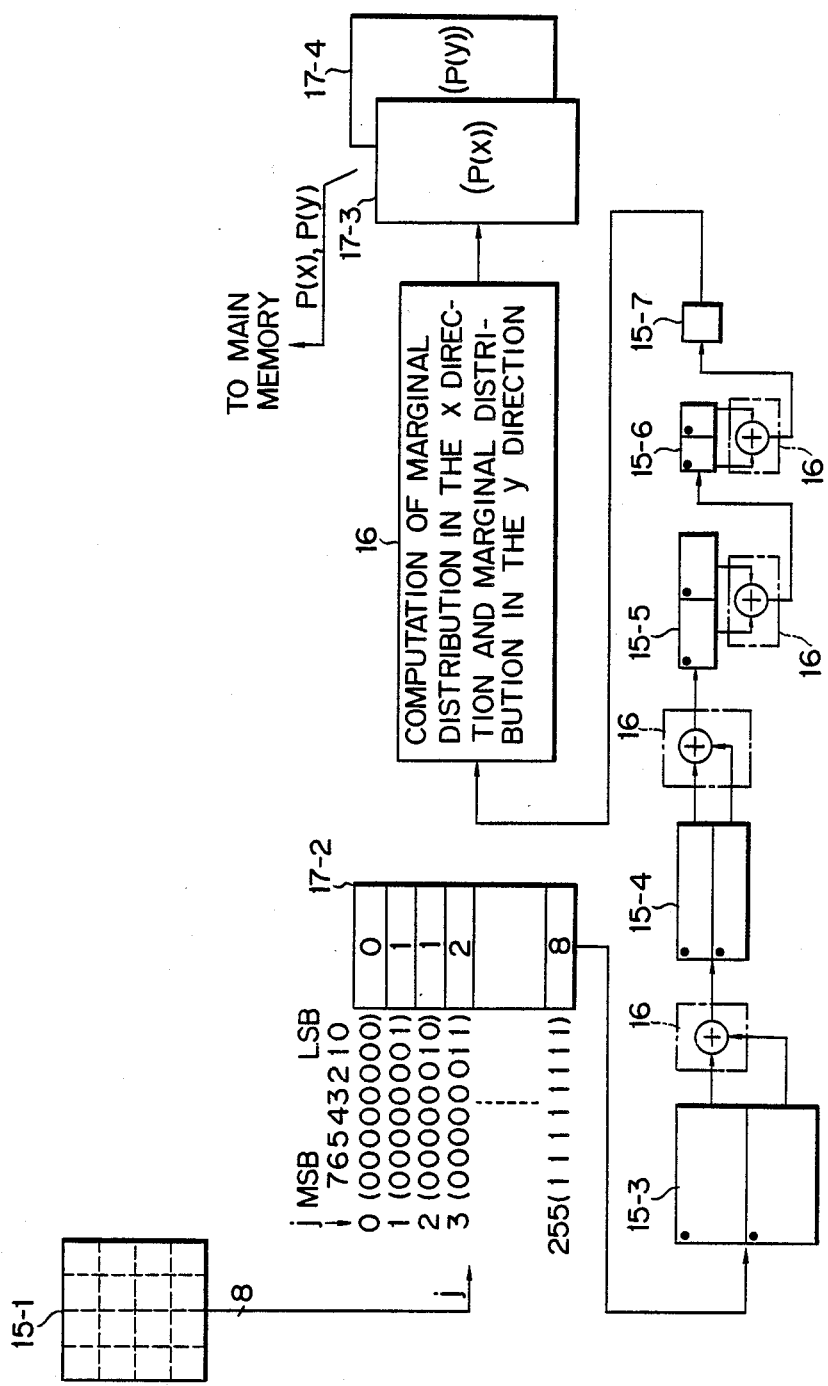
F I G. 3B

IMAGE PROCESSING DEVICE SUITABLE FOR OBTAINING THE VOLUME AND CENTER OF GRAVITY OF A THREE-DIMENSIONAL BINARY IMAGE

BACKGROUND OF THE INVENTION

1. Field of the Invention

The present invention relates to a technique for obtaining the volume and center of gravity of a three-dimensional image, and more particularly, to a technique for obtaining the volume and center of gravity of a three-dimensional binary image by processing it using a processor having a function of processing a two-dimensional image of variable density (gray level).

2. Description of the Related Art

In recent years, it has been made possible to process two-dimensional images at high speeds by using processors specially adapted for two-dimensional image processing. This type of processor is called a two-dimensional image processor. Owing to advances in the two-dimensional image processors the area and center of a two-dimensional image can be measured at a high speed.

Recently, on the other hand, the construction of a three-dimensional image from tomogram images obtained by computed tomography (CT) has been performed. The measurement of the volume and center of gravity of the constructed three-dimensional image is also needed.

Even if a three-dimensional image is a binary image, it is considerably large in data size as compared with a two-dimensional image. Thus, to process a three-dimensional image a large volume of data must be processed. It is difficult, therefore, to speed up the three-dimensional image processing. The development of a three-dimensional image processor is highly desired. However, the three-dimensional image processor has not yet been realized because of the necessity for very complicate circuit arrangements.

Accordingly, so far, it was difficult to measure the volume and center of gravity of a three-dimensional binary image with a simple arrangement and at a high speed.

SUMMARY OF THE INVENTION

It is an object of this invention to provide an image processing device capable of obtaining the volume and center of gravity of a three-dimensional binary image easily and rapidly.

To achieve the object of this invention, an image processing device of this invention comprises:

first frame memory (15-1) having a storage capacity of (M×m) bits in an x direction, (N×n) bits in a y direction, and p bits in a z direction, and storing image data of p bits in each (x, y) coordinate position, the first frame memory being logically divided into m equal parts in the x direction and n equal parts in the y direction to form 0-th through (m×n−1)-th memory sections, and the 0-th through (m×n−1)-th memory sections respectively storing 0-th through (m×n−1)-th divided three-dimensional binary image parts obtained by dividing a three-dimensional binary image composed of M pixels in the x direction, N pixels in the y direction, and (m×n×p) pixels in the z direction by a unit of p pixels in the z direction;

second frame memory (15-2) having a storage capacity of (M×m) bits in the x direction and (N×n) bits in the y direction, and storing in each (x, y) position thereof data of q bits representing the section number of the section to which the same (x, y) position of the first frame memory (15-1) belongs;

histogram computing unit (16, 17-1) for concatenating p-bit data in each (x, y) coordinate position of the first frame memory (15-1) and q-bit data in the same (x, y) position of the second frame memory (15-2) with the p-bit data taken as lower data and the q-bit data as upper data, and obtaining a histogram representing a distribution of the number of pieces of the concatenated (p+q)-bit data having the same value;

first marginal distribution computing unit (11) for computing a marginal distribution P(z) of the three-dimensional binary image for the z direction thereof on the basis of the histogram obtained by the histogram computing unit (16, 17-1);

data conversion unit (16, 17-2) for converting the p-bit data stored in each (x, y) coordinate position of the first frame memory (15-1) to the number of bits having a logic 1 contained in the p-bit data to form a first image;

adding unit (15-3 to 15-7, 16, 17-2 to 17-4) for dividing the first image obtained by the data conversion unit (16, 17-1) into m equal parts and n equal parts in the x and y directions, respectively, to form (m×n) partial images, and adding image data located in corresponding positions in the (m×n) partial images to obtain a second image;

second marginal distribution computing unit (11) for computing a marginal distribution P(x) and a marginal distribution P(y) of the three-dimensional binary image for the x and y directions thereof on the basis of the second image;

volume computing unit (11) for computing the volume of the three-dimensional binary image on the basis of either of the three marginal distributions P(x), P(y) and P(z); and center of gravity computing unit (11) for computing the position of the center of gravity of the three-dimensional binary image on the basis of the volume computed by the volume computing means (11) and the marginal distributions P(x), P(y) and P(z).

According to this invention, a three-dimensional binary image is divided into a plurality of parts, and pixels composing each partial image are handled and processed as two-dimensional data with gradations of variable density. As a result, the volume and center of gravity of the three-dimensional binary image can be measured easily and rapidly by means of a two-dimensional image processor without the need for a special processor for three-dimensional images.

BRIEF DESCRIPTION OF THE DRAWINGS

FIG. 1 is a block diagram of an image processing device embodying this invention;

FIG. 2 shows the arrangement and operation of the frame memory of FIG. 1, and the construction of a three-dimensional image whose volume and center of gravity are to be obtained, and the method of storing the three-dimensional image in a frame memory in accordance with this invention; and FIGS. 3A and 3B are functional block diagrams with data flow to explain the image processing method in the image processing device of FIG. 1, more specifically, FIG. 3A is used for explaining processes for obtaining a histogram, a marginal distribution P(z) along the z direction, the volume and center of gravity, and FIG. 3B is used for explaining a marginal distribution P(x) in the x direction, and a marginal distribution P(y) in the y direction.

DETAILED DESCRIPTION OF THE PREFERRED EMBODIMENT

Figure 3A:
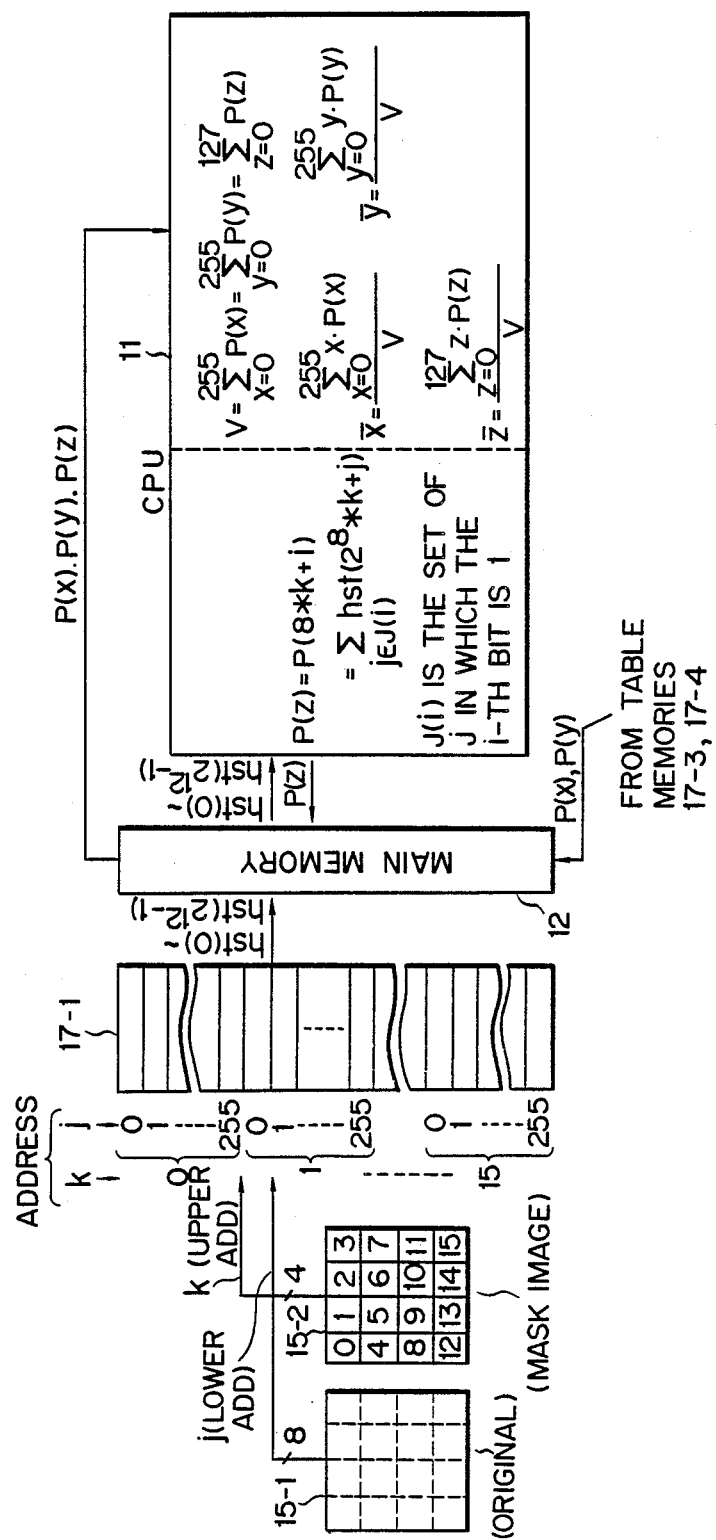

An arrangement of the image processing device according to an embodiment of this invention will now be described with reference to FIG. 1.

In FIG. 1 a CPU (Central Processing Unit) 11 controls the overall operation of the image processing device. A control bus 18 is coupled to CPU 11 to transfer control data of various kinds. A main memory 12 is coupled to CPU 11 via control bus 18. Main memory 12 stores a program specifying operations of CPU 11, and data necessary for image processing. A display controller 14 is coupled to CPU 11 via control bus 18. Frame memories 15-1, 15-2, ... 15-7 are coupled to CPU 11 via control bus 18. Each frame memory has a capacity of 1024 ($=M \times m$) bits in the x coordinate direction, 1024 ($=N \times n$) bits in the y coordinate direction, and 8 ($=p$) bits in the z coordinate direction. Thus, each frame memory has the ability to store image data of $1024 \times 1024$ pixels each having density gradations of 8 bits. A two-dimensional image processor (a processor specially adapted for processing two-dimensional images) 16 is coupled to CPU 11 via control bus 18. Table memories 17-1, 17-2, 17-3, 17-4 are coupled to CPU 11 via control bus 18. Table memory 17-1 is provided with entries assigned 12-bit addresses ($0 \sim 2^{12} - 1$). Each entry of table memory 17-1 stores the number of pieces of data each having the same value as the address value assigned to the entry. That is, table memory 17-1 is used for holding a histogram.

Table memory 17-2 is used for storing a data conversion table which has entries each assigned an address of 8 bits. Each entry of the data conversion table stores the number of 1s contained in the address assigned thereto. Control bus 18 is used in order for CPU 11 to control various parts. A data bus 19 is coupled to display controller 14, frame memories 15-1 through 15-7, image processor 16, and table memories 7-1 through 17-4 so as to transfer image data among these. A CRT monitor 13 is coupled to display controller 14. CRT monitor 13 displays an image under the control of display controller 14. A data entry keyboard is associated with CRT monitor 13.

Image processor 16 has functions to perform the following operations. (1) The processor obtains a histogram of gray level (density) from image data of an image and image data of another image, and stores the histogram in a table memory. In this embodiment 8-bit image data and 4-bit image data are combined to 12-bit image data, and a histogram of gray level represented by the resultant image data is obtained. The histogram is then stored in table memory 17-1. (2) The processor performs an arithmetic operation of image data of corresponding pixels of the two images so that the result of the arithmetic operation is made a new image. In this embodiment image data of corresponding pixels of two images are added together, and the sum is made a new image. In this case when 255 is exceeded by the sum, 55 will be made new image data. (3) The processor converts image data of an input image to other data using the data conversion table stored in a table memory. In this embodiment 8-bit image data of an input image is converted to data representing the number of 1s contained in the image data by using the data conversion table stored in table memory 17-2. (4) The processor obtains marginal distributions of a three-dimensional image with respect to the x- and y-coordinate directions thereof.

Next, the storage of a three-dimensional binary image in frame memory 15-1 will be described with reference to FIG. 2.

In this embodiment frame memory 15-1 is used for storing a three-dimensional binary image whose volume and center of gravity are to be measured. As shown in FIG. 2, frame memory 15-1 is logically divided into 4 ($=m$) equal parts along the x coordinate axis and into 4 ($=n$) equal parts along the y coordinate axis. Each divided region of frame memory 15-1 is referred to as a section. Sixteen sections of frame memory 15-1 are assigned consecutive numbers (section numbers) of 0 through 15 as shown. Each section of frame memory 15-1 stores corresponding one of 16 partial three-dimensional binary images of equal size.

Frame memory 15-1 has a capacity of 1024 bits along the x coordinate axis, 1024 bits along the y coordinate axis, and 8 bits along the z coordinate axis. Thus, each section of frame memory 15-1 has a capacity of 256 ($=M$) bits along the x coordinate axis, 256 ($=N$) bits along the y coordinate axis, and 8 ($=p$) bits along the z coordinate axis. It will be evident, therefore, that, when a three-dimensional binary image is handled, each section of frame memory 15-1 can store image data of 256 pixels along the x coordinate axis, 256 pixels along the y coordinate axis, and 8 pixels (8 slices) along the z coordinate axis. Thus, frame memory 15-1 can collectively store data of 16 ($=$the number of sections)$\times 8$ ($=$the number of slices) pixels, i.e., 128 pixels (128 slices) along the z coordinate axis.

As will be understood from the foregoing, frame memory 15-1 can store a three-dimensional binary image composed of 256 pixels along the x coordinate axis, 256 pixels along the y coordinate axis, and 128 pixels along the z coordinate axis.

In this embodiment it is supposed that the volume and center of gravity of a three-dimensional binary image composed of 256 ($=M$) pixels in the x direction, 256 ($=N$) pixels in the y direction, and 128 ($=m \times n \times p$) pixels in the z direction as shown in FIG. 2. The three-dimensional binary image is divided by 8 ($=p$) pixels in the z direction, and the resultant 16 ($=m \times n$) partial three-dimensional binary images are stored in corresponding sections of frame memory 15-1. That is, the partial three-dimensional images with the z coordinate values of 0 to 7, 8 to 15, ... and 120 to 127 are stored in the sections of frame memory 15-1 having the section numbers 0, 1, ... and 15, respectively.

As is the case with frame memory 15-1, frame memory 15-2 is logically divided into 4 equal parts in the x and y directions, namely, 16 sections. The 16 sections are assigned section numbers 0 to 15, respectively.

In each (x, y) coordinate position in frame memory 15-2 represented by the x and y coordinates, data (only the lower 4 bits are valid) is stored which represents the number k ($k=0, 1, \ldots 15$) of the section to which the (x, y) coordinate position belongs. The 4-bit data representing the section number k is called mask image data. Where the mask image data stored in frame memory 15-2 is regarded as density-gradation data (gray level data), the two-dimensional image stored in frame memory 15-2 is referred to as a mask image.

Next, the image processing for obtaining the volume and center of gravity of a three-dimensional binary image will be described with reference to FIGS. 3A and 3B.

First, with reference to FIG. 3A, the processes for obtaining a histogram and a marginal distribution P(z) will be described.

Image processor 16 handles data stored in frame memory 15-1 as the density-gradation data of a two-dimensional image. The image stored in frame memory 15-1 is referred to as an original image hereinafter.

Image processor 16 concatenates the 4-bit mask image data k (=0, 1, ... 15) stored in a (x, y) coordinate position of frame memory 15-2 and 8bit image data j (=0, 1, ... 125) stored in the corresponding (x, y) coordinate position of frame memory 5-1 with the data k taken as the upper part and the data j as the lower part. Image processor 16 obtains the number of pieces of the concatenated 12-bit data which have an equal value by scanning frame memories 5-1 and 15-2. That is, image processor 16 obtains a histogram hst ($2^8 \times k+j$) for density gradations represented by the concatenated 12bit data. Each of memory areas of table memory 17-1 is assigned a 12bit address. Image processor 16 stores in an address ($2^8 \times k+j$) of table memory 17-1 the number of pieces of the concatenated data which have the same value as the said address. Thus, for instance, if there are 100 pieces of data which have a value of 1 in the first section, then the concatenated data is 1-1, and the value 100 is stored in the address 1-1 of table memory 17-1.

The histogram hst ($2^8 \times k+j$) is obtained in accordance with the following processes. Table memory 7-1 is initialized. An initial value of the (x, y) coordinate position is set. The image data stored in the (x, y) coordinate positions of frame memories 15-1 and 5-2 are read out for concatenation. Table memory 17-1 is addressed by the concatenated data. The count value of the memory area addressed is incremented by 1. The (x, y) coordinate position is updated, and the above operations are repeated. At a time when the (x, y) coordinate position reaches the final value the histogram hst ($2^8 \times k+j$) is obtained.

When the histogram hst ($2^8 \times k+j$), i.e., hst (0) through hst ($2^{12}-1$), is obtained, image processor 16 informs CPU 11 of this fact. In response to this, CPU 11 reads the contents of table memory 17-1 into main memory 12. CPU 11 computes the z-direction marginal distribution P(z) (z=0, 1, ... 127) of the three-dimensional binary image on the basis of the histogram hst ($2^8 \times k+j$) read into main memory 12.

Prior to the description of the computation of the marginal distribution P(z), an marginal distribution image P(x, y), x-direction marginal distribution P(x), y-direction marginal distribution P(y), and z-direction marginal distribution P(z) will be described.

The marginal distribution image P(x, y) is defined as the number of pixels having a value of a logic "1" among the pixels aligned in the z direction at a (x, y) coordinate position. Supposing that the value of a pixel in the position of (x, y, z) of the three-dimensional image is V (x, y, z)(either "1" or "0"), and the numbers of pixels of the three-dimensional image in the x, y and z directions are nx, ny and nz, respectively, the marginal distribution image P(x, y) will be expressed as in equation (1).

$$P(x,y) = \sum_{z=0}^{nz-1} V(x,y,z) \quad (1)$$

The marginal distributions P(x), P(y) and P(z) are defined as in equations (2) through (4) by using the marginal distribution image P(x, y).

$$P(x) = \sum_{y=0}^{ny-1} \sum_{z=0}^{nz-1} V(x,y,z) = \sum_{y=0}^{ny-1} P(x,y) \quad (2)$$

$$P(y) = \sum_{x=0}^{nx-1} \sum_{z=0}^{nz-1} V(x,y,z) = \sum_{x=0}^{nx-1} P(x,y) \quad (3)$$

$$P(z) = \sum_{x=0}^{nx-1} \sum_{y=0}^{ny-1} V(x,y,z) \quad (4)$$

As will be understood from equation (4), the z-direction marginal distribution P(z) of the three-dimensional binary image is defined as the number of pixels having a value of a logic "1" on a x-y plane at a position of z.

The z coordinate values of partial three-dimensional binary images stored in the k-th section of frame memory 15-1 stay within a range of $8 \times k \geq z \geq 8k+7$. That is, the z coordinate value of that pixel in the three-dimensional binary image which corresponds to the i-th bit in the 8-bit image data j stored in the k-th section is represented by z=8k+i. In this case i=0 (LSB), 1, 2, ... 7 (MSB). Therefore, if J(i) is defined as the set of image data j whose i-th bit is "1", then the marginal distribution P(z) will be changed as shown in equation (5).

$$P(z) = P(8 \cdot K + i) = \sum_{j \in J(i)} hst (2^8 \cdot K + j) \quad (5)$$

As will be understood from equation (5) the z-direction marginal distribution P(z) becomes a function of the histogram hst ($2^8 \times k+j$).

CPU 11 performs an operation of equation (5) using the histogram hst ($2^8 \times k+j$) for each of combinations of k and j which has been read into main memory 12 from table memory 17-1. Thus, the z-direction marginal distribution P(z) is computed for each of z coordinate values and then stored in main memory 12.

Next, computing P(x) and P(y) will be described with reference to FIG. 3B.

In this embodiment such a data conversion table as shown in FIG. 3B is placed in table memory 17-2. In each entry of this data conversion table is set a value (conversion value w) representing the number of 1s contained in the address assigned to the entry.

Image processor 16 converts 8-bit image data j of the original image in frame memory 15-1 using table memory 17-2. Image processor 16 addresses table memory 17-2 by 8-bit image data j in each (x, y) coordinate position of frame memory 15-1 to read out the value (conversion value w) stored in the corresponding entry. Image processor 16 writes the read conversion value w into the corresponding (x, y) coordinate position of frame memory 15-3. That is, image processor 16 converts the image data j to the value w set in the entry defined by the image data j in table memory 17-2 and then writes the conversion value w into the corresponding (x, y) coordinate position of frame memory 15-3. Where the data j to be converted is image data stored in the k-th section, the above conversion will correspond to calculation of the number of pixels of a logic 1 contained in the 8 pixels within the range of z=8×k to 8×k+7 in the corresponding (x, y) coordinate position of the three-dimensional binary image to be measured.

As an example, suppose now that the image data j stored in the position of x=0 and y=0 in the 0-th section of frame memory 15-1 is 00000011. In this case, since the number of 1s contained in this image data is 2, and the value 2 is previously stored in address 3 of table memory 17-2, the value 2 is stored in the position of X=0 and y=0 of frame memory 15-3.

An image formed of data stored in frame memory 15-3 is referred to as a first image under the condition that the above-described data conversion and writing of the conversion value w into frame memory 15-3 have been performed for each of pieces of image data j in all the (x, y) coordinate positions of frame memory 15-1.

When the first image is stored in frame memory 15-3, image processor 16 divides the first image into two equal parts in the y direction as shown in FIG. 3B. Image processor 16 performs addition operation for image data in corresponding positions (the same in the relative position in the divided images) in the divided upper and lower images. In FIG. 3B examples of the corresponding positions are indicated by dots. Image processor 16 stores the sum, for example, in the upper region (a size of 1024×512) of frame memory 15-4. Further, image processor 16 divides the image formed of addition results and stored in frame memory 15-4 into two equal parts in the y direction, and performs addition operation for image data in corresponding positions (the same in the relative position in the divided images) in the divided upper and lower images. Image processor 16 stores the sums in, for instance, a region (of a size of 1024×256) Corresponding to the upper image of frame memory 15-5. Subsequently, image processor 16 divides the image stored in frame memory 15-5 into two equal parts in the x direction, and adds image data in corresponding positions in the left and right images. Image processor 16 stores the sums in, for instance, a region (of a size of 512×256) corresponding to the left image of frame memory 15-6. Image processor 16 divides the image formed of the sums and stored in frame memory 15-5 into two equal parts in the x direction, adds image data in corresponding positions in the left and right images, and stores the results in a region (of a size of 256×256) corresponding to the left image of frame memory 15-7. The image formed of the sums and stored in this region of frame memory 15-7 is referred to as a second image. The image data located at a (x, y) coordinate position in the second image represents the number of pixels with a value of 1 among 128 pixels aligned in the z direction at the (x, y) coordinate position in the to-be-measured three-dimensional binary image. That is, the second image represents the marginal distribution image P(x, y) when nz=128 in equation (1).

When the second image, i.e., the marginal distribution image P(x, y) is stored in frame memory 15-7, image processor 16 obtains the marginal distribution of the second image for its x direction. That is, image processor 16 computes the x-direction marginal distribution P(x) (x=0, 1, ... 255) of the three-dimensional binary image to be measured in accordance with equation (2). The thus obtained marginal distribution P(x) is stored in table memory 17-3. Similarly, image processor 16 computes the variable-density marginal distribution of the second image for its y direction, i.e., the y-direction marginal distribution P(y) (y=0, 1, ... 255) of the three-dimensional binary image in accordance with equation (3), and stores this in table memory 17-4. When storing P(x) and P(y) in table memories 17-3 and 17-4 image processor 16 informs CPU 11 of this fact.

Returning back to FIG. 3A the method for obtaining the volume and center of gravity of the three-dimensional image will be described.

When informed of the computation and storage of P(x) and P(y) from image processor 16, CPU 11 reads P(x) and P(y) into main memory 12 from table memories 17-3 and 17-4. CPU 11 obtains the volume V of the three-dimensional binary image to be measured in accordance with equation (6) to follow by using either the x-direction marginal distribution P(x) (x=0, 1, ... 255), the y-direction marginal distribution P(y) (y=0, 1, ... 255), or P(z) (z=0, 1, ... 127), which have all been read into main memory 12.

$$V = \sum_{x=0}^{255} P(x) = \sum_{y=0}^{255} P(y) = \sum_{z=0}^{127} P(z) \quad (6)$$

By using the thus obtained volume V; and P(x), P(y) and P(z), CPU 11 obtains the center of gravity (x, y, z) of the three-dimensional binary image to be measured in accordance with following equations (7) through (9).

$$x = \frac{\sum_{x=0}^{255} x \cdot P(x)}{V} \quad (7)$$

$$y = \frac{\sum_{y=0}^{255} x \cdot P(y)}{V} \quad (8)$$

$$z = \frac{\sum_{z=0}^{127} x \cdot P(z)}{V} \quad (9)$$

By the above operations the volume and center of gravity of the three-dimensional binary image can be found. CPU 11 stores data on the computed volume and center of gravity in main memory 12.

With this embodiment a three-dimensional binary image is divided into a plurality of partial images, and pixels composing each partial image are handled and processed as two-dimensional data with gradations of variable density. As a result, the volume and center of gravity of a three-dimensional binary image can be measured easily and rapidly by means of a two-dimensional image processor without the need for a special processor for three-dimensional images.

With the above embodiment, to facilitate the understanding of this invention, frame memory 15-1 for storing an original image, frame memory 15-2 for storing the mask image, frame memory 15-3 for storing the first image, frame memory 17-7 for storing the second image, table memory 17-1 for storing the histogram, table memory 17-2 for storing the data conversion table, table memory 17-3 for storing the marginal distribution P(x), and table memory 17-4 for storing the marginal distribution P(y) are previously provided. Alternatively, some of memories may be shared.

The data conversion table and the mask image may be loaded from main memory 12 to any given memory if desired.

In the above embodiment frame memory 15-1 is divided into four equal parts along the x and y axes to form 16 sections. However, as long as the three-dimensional binary image to be measured has (M×m) pixels in the x direction, (N×n) pixels in the y direction, and (m×n×p) pixels in the z direction, and frame memory 15-1 has p bits in the z direction and can secure (m×n)

sections each of M bits in the x direction and N bits in the y directions, the way of dividing frame memory 15-1 may be arbitrary.

The method of obtaining the marginal distribution image P(x, y) using frame memories 15-3 and 15-4 is not limited to the method in the embodiment. Provided that an image identical with the second image can finally be obtained the ways of division, addition, etc., may be arbitrary.

What is claimed is:

1. An image processing device for obtaining the volume and center of gravity of a three-dimensional binary image, comprising:

first frame memory means having a storage capacity of (M×m) bits in an x direction, (N×n) bits in a y direction, and p bits in a z direction, for storing image data of p bits in each (x, y) coordinate position, said first frame memory means being logically divided into m equal parts in the x direction and n equal parts in the y direction to form 0-th through (m×n−1)-th memory sections, and said 0-th through (m×n−1)-th memory sections respectively storing 0-th through (m×n−1) th divided three-dimensional binary image parts obtained by dividing a three-dimensional binary image composed of M pixels in the x direction, N pixels in the y direction, and (m×n×p) pixels in the z direction by a unit of p pixels in the z direction;

second frame memory means having a storage capacity of (M×m) bits in the x direction and (N×n) bits in the y direction, and storing in each (x, y) coordinate position thereof data of q bits representing the section number of the section to which the same (x, y) coordinate position of said first frame memory means belongs;

histogram computing means for concatenating p-bit data in each (x, y) coordinate position of said first frame memory means and q-bit data in the same (x, y) coordinate position of said second frame memory means with the p-bit data taken as lower data and the q-bit data as upper data, and obtaining a histogram representing a distribution of the number of pieces of the concatenated (p+q)-bit data having an equal value;

first marginal distribution computing means for computing a marginal distribution of said three-dimensional binary image for the z direction thereof, on the basis of the histogram obtained by said histogram computing means;

data conversion means for converting the p-bit data stored in each (x, y) coordinate position of said first frame memory means to the number of bits having a logic 1 contained in the p-bit data, to form a first image;

adding means for dividing the first image obtained by said data conversion means into m equal parts and n equal parts in the x and y directions, respectively, to form (m×n) partial images, and adding image data located in the same relative position in the (m×n) partial images, to obtain a second image;

second marginal distribution computing means for computing a marginal distribution P(x) and a marginal distribution P(y) of said three-dimensional binary image for the x and y directions thereof, on the basis of the second image;

volume computing means for computing the volume of the three-dimensional binary image on the basis of either of the three marginal distributions P(x), P(y), and P(z); and center of gravity computing means for computing the position of the center of gravity of the three-dimensional binary image, on the basis of the volume computed by said volume computing means and the marginal distributions P(x), P(y), and P(z).

2. An image processing device according to claim 1, wherein said data conversion means comprises:

a data conversion table having memory areas assigned addresses, and storing in each of said memory areas the number of bits of a logic 1 contained in the address assigned thereto;

addressing means for addressing said data conversion table by use of the p-bit data stored in each (x, y) coordinate position of said first memory means; and reading means for reading the value stored in a memory area addressed by said addressing means of said data conversion table, and storing it in the corresponding (x, y) coordinate position thereof.

3. An image processing device according to claim 1, wherein said adding means divides said first image into two images of equal size, with M pixels in the x direction and N pixels in the y direction taken as a minimum unit; adds image data in substantially the same positions in the two images of equal size; obtains a third image formed of image data resulting from addition; and repeatedly performs the division and addition, using the third image as a new first image, until the third image becomes M pixels in the x direction and N pixels in the y direction in size, the finally obtained third image of M pixels in the x direction and N pixels in the y direction in size being made the second image.

4. An image processing device according to claim 1, wherein said first marginal distribution computing means obtains the marginal distribution P(z) for the z direction, in accordance with the following equation:

$$P(z) = \sum_{j \in J(i)} hst(2^p \times k + j)$$

where k is a memory section number, j is p-bit image data, hst($2^p \times k + j$) is a histogram of concatenated data specified by the value k and data j, and J(i) is the set of the p-bit image data in which the i-th bit is a logic 1.

5. An image processing device according to claim 1, wherein said histogram computing means comprises:

table memory means for storing the histogram;

means for producing the concatenated data while updating the (x, y) coordinate position in sequence;

means for addressing said table memory means by use of the concatenated data; and means for incrementing by one the count value stored in a memory area of said table memory means designated by the concatenated data.

6. An image processing device according to claim 1, wherein said second marginal distribution computing means computes the marginal distribution P(x) for the x direction and the marginal distribution P(y) for the y direction, in accordance with the following equations:

$$P(x) = \sum_{y=0}^{ny-1} P(x,y)$$

$$P(y) = \sum_{x=0}^{nx-1} P(x,y)$$

where nx is the number of pixels in the x direction and ny is the number of pixels in the y direction of the three-dimensional binary image, and P(x, y) is the marginal distribution image represented by image data in the (x, y) coordinate position of the second image.

7. An image processing device according to claim 6, wherein said volume computing means obtains the volume in accordance with the following equation:

$$V = \sum_{x=0}^{nx-1} P(x) = \sum_{y=0}^{ny-1} P(y) = \sum_{z=0}^{nz-1} P(z)$$

where nz is the number of pixels of the three-dimensional binary image in the z direction.

8. An image processing device according to claim 7, wherein said volume computing means obtains the co-ordinates of the center of gravity in accordance with the following equations:

$$X = \frac{\sum_{x=0}^{nx-1} x \cdot P(x)}{V}$$

$$Y = \frac{\sum_{y=0}^{ny-1} y \cdot P(y)}{V}$$

$$Z = \frac{\sum_{z=0}^{nz-1} z \cdot P(z)}{V}$$

9. An image processing device for obtaining the volume and center of gravity of a three-dimensional binary image formed of M pixels, N pixels, and (m×n×p) pixels in x, y, and z directions, comprising:
   0-th through (m=n−1)-th memory means each having a storage capacity of M bits, N bits, and p bits in the directions of x, y and z coordinate axes, said 0-th through (m×n−1)-th memory means respectively storing 0-th through (m×n−1)-th divided three-dimensional binary images obtained by dividing the three-dimensional binary image by a unit of p pixels in the direction of z coordinate axis;
   histogram computing means for obtaining a histogram representing a distribution of the number of concatenated data of an equal value, the concatenated data consisting of (p+q)-bit data having as lower data thereof p-bit data in each (x, y) coordinate position of said 0-th through (m×n−1)-th memory means, and as upper data thereof, q-bit data representing the memory number of a memory having the p-bit data;
   first marginal distribution computing means for computing the marginal distribution of the three-dimensional binary image for its z coordinate axis, on the basis of the histogram computed by said histogram computing means;
   data conversion means for converting the p-bit data in each (x, y) coordinate position of said 0-th through (m×n−1)-th memory means to data representing the number of bits of a logic 1 contained in the p-bit data;
   means for adding, among the conversion data obtained by said conversion means, conversion data in positions which are the same in the relative address position, to obtain a marginal distribution P(x, y) image of the three-dimensional binary image;
   means for obtaining a marginal distribution in the x direction and a marginal distribution in the y direction by using the marginal distribution image;
   volume computing means for computing the volume V of the three-dimensional binary image by using one of the marginal distributions P(x), P(y), and P(z); and
   center of gravity computing means for computing the position in coordinates of the center of gravity of the three-dimensional binary image by using the volume V computed by said volume computing means and the marginal distributions P(x), P(y), and P(z).

10. An image processing device according to claim 9, wherein said 0-th through (m×n−1)-th memory means is formed by logically dividing said first memory means into m equal parts in the x direction and n equal parts in the y direction, which has a storage capacity of (M×m) bits in the x direction, (N×n) bits in the y direction, and p bits in the z direction; and
   wherein said histogram computing means comprises second frame memory means having a storage capacity of (M×m) bits in the x direction and (N×n) bits in the y direction, for storing, in each (x, y) coordinate position, q-bit data representing the number of said 0-th to (m×n−1)-th memory means to which the same (x, y) coordinate position of said first memory means belongs; and
   means for concatenating the p-bit data in each (x, y) coordinate position of said first frame memory means and the q-bit data in the same (x, y) coordinate position of said second frame memory means, with the p-bit data as lower data and the q-bit data as upper data, to generate concatenated data, and obtaining a histogram of the concatenated data for all the (x, y) coordinate positions.

11. An image processing device according to claim 9, wherein said histogram computing means comprises:
   table memory means for storing the histogram;
   means for producing the concatenated data while updating the (x, y) coordinate position in sequence;
   means for addressing said table memory means by use of the concatenated data; and
   means for incrementing by one the count value stored in a memory area of said table memory means designated by the concatenated data.

12. An image processing device according to claim 9, wherein said conversion means comprises:
   a data conversion table having memory areas assigned addresses, for storing in each of said memory areas the number of bits of a logic 1 contained in the address assigned thereto;
   means for addressing said data conversion table by use of the p-bit data stored in each (x, y) coordinate position of said 0-th through (m×n−1)-th memory means; and
   means for reading said value stored in a memory area addressed by said addressing means of said data conversion table and storing it in the corresponding (x, y) coordinate position thereof.

13. An image processing device according to claim 10, wherein said means for obtaining marginal distributions divides a first image, formed of conversion data obtained by said conversion means, into two images of equal size, with M pixels in the x direction and N pixels in the y direction taken as a minimum unit; adds image data in substantially the same positions in the two images of equal size; obtains a second image formed of image data resulting from addition; and repeatedly performs the division and addition, using the second image as a new first image, until the second image becomes M pixels in the x direction and N pixels in the y direction in size, the finally obtained second image of M pixels in the x direction and N pixels in the y direction in size being made the marginal distribution image P(x, y).

14. An image processing device according to claim 9, wherein said first marginal distribution computing means obtains the marginal distribution P(z) for the z direction, in accordance with the following equation:

$$P(z) = \sum_{j \in J(i)} hst(2^p \times k + j)$$

where k is a memory section number, j is p-bit image data, hst($2^p \times k+j$) is a histogram of concatenated data specified by the value k and data j, and J(i) is the set of the p-bit image data in which the i-th bit is a logic 1.

15. An image processing method for obtaining the volume and center of gravity of a three-dimensional binary image, comprising:
dividing a three-dimensional binary image composed of M pixels in an x direction, N pixels in a y direction, and (m×n×p) pixels in a z direction, by a p-pixel unit in the z direction, to form 0-th through (m×n−1) partial three-dimensional binary images;
storing the 0-th through (m×n−1)-th partial three-dimensional binary images in 0-th through (m×n−1)-th memory blocks each having a storage capacity of M bits in the x direction, N bits in the y direction, and p bits in the z direction, respectively;
concatenating p-bit data in each (x, y) coordinate position of said memory blocks and q-bit data representing the number of the memory block with the p-bit data as lower data and the q-bit data as upper data, to generate (p+q)-bit concatenated data;
obtaining a histogram representing a distribution of the concatenated data of equal values;
computing a marginal distribution of the three-dimensional binary image for its z direction, on the basis of the histogram;
converting the p-bit data in each (x, y) coordinate position of said memory blocks to data representing the number of bits of a logic 1 contained in the p-bit data, to obtain a first image;
dividing the first image into (m×n) partial images with m images in the x direction and n images in the y direction, and adding image data located, in the same relative positions in the partial images to obtain a second image representing a marginal distribution image P(x, y) of the three-dimensional binary image;
obtaining a marginal distribution P(x) in the x direction and a marginal distribution P(y) in the y direction, on the basis of the marginal distribution image represented by the second image;
computing the volume V of the three-dimensional binary image on the basis of one of the marginal distributions P(x), P(y), and P(z); and
computing the position in coordinates of the center of gravity of the three-dimensional binary image, on the basis of the volume V and the marginal distributions P(x), P(y), and P(z).

16. An image processing method according to claim 15, wherein the data converting to obtain the first image comprises:
preparing a data conversion table having memory areas assigned addresses, for storing in each of said memory areas the number of bits of a logic 1 contained in the address assigned thereto;
addressing said data conversion table by use of the p-bit data stored in each (x, y) coordinate position of said 0-th through (m×n−1)-th memory blocks; and
reading a value stored in an addressed memory area of said data conversion table and storing the value.

17. An image processing method according to claim 15, wherein the obtaining of a second image comprises dividing the first image into two images of equal size, with M pixels in the x direction and N pixels in the y direction taken as a minimum unit; adding image data in substantially the same positions in the two images of equal size., obtaining a third image formed of image data resulting from addition; repeatedly performing the division and addition, using the third image as a new first image, until the third image becomes M pixels in the x direction and N pixels in the y direction in size; and making the finally obtained third image of M pixels in the x direction and N pixels in the y direction in size the second image.

18. An image processing method according to claim 15, wherein said comprising a marginal distribution P(z) obtains the marginal distribution for the z direction in accordance with the following equation:

$$P(z) = \sum_{j \in J(i)} hst(2^p \times k + j)$$

where k is a memory section number, j is p-bit image data, hst($2^p k+j$) is a histogram of concatenated data specified by the value k and data j, and J(i) is the set of the p-bit image data in which the i-th bit is a logic 1.

19. An image processing method according to claim 15, wherein said computing a marginal distribution P(z) comprises:
initializing a table memory;
producing concatenated data while updating the (x, y) coordinate position in sequence;
addressing said table memory by use of the concatenated data; and
incrementing by one the count value stored in a memory area of said table memory designated by the concatenated data.

20. An image processing device for implementing the method claimed in claim 15.

* * * * *

UNITED STATES PATENT AND TRADEMARK OFFICE
CERTIFICATE OF CORRECTION

PATENT NO. : 4,975,973

DATED : December 04, 1990

INVENTOR(S) : Akira Kasano et al.

It is certified that error appears in the above-identified patent and that said Letters Patent is hereby corrected as shown below:

Claim 1, column 9, line 23, change " 1) th" to --1)-th--.

Claim 9, column 11, line 37, change "=" to -- x --.

Claim 17, column 14, line 27 change "., " to -- ; --.

Claim 18, column 14, line 43, change "$2^p k$" to --$2^p \times k$--.

Signed and Sealed this

Thirteenth Day of April, 1993

Attest:

STEPHEN G. KUNIN

Attesting Officer

Acting Commissioner of Patents and Trademarks